June 30, 1925.

E. W. SAUNDERS

EXHAUST GAS DEFLECTOR FOR POWER OPERATED VEHICLES

Filed Nov. 7, 1923

1,543,877

INVENTOR
Edward W. Saunders
By Bakewell & Church
ATTORNEYS

Patented June 30, 1925.

1,543,877

UNITED STATES PATENT OFFICE.

EDWARD W. SAUNDERS, OF ST. LOUIS, MISSOURI.

EXHAUST-GAS DEFLECTOR FOR POWER-OPERATED VEHICLES.

Application filed November 7, 1923. Serial No. 673,343.

*To all whom it may concern:*

Be it known that I, EDWARD W. SAUNDERS, a citizen of the United States, residing at St. Louis, Missouri, have invented a certain new and useful Improvement in Exhaust-Gas Deflectors for Power-Operated Vehicles, of which the following is a full, clear, and exact description, such as will enable others skilled in the art to which it appertains to make and use the same.

This invention relates to automobiles and other passenger carrying vehicles of the kind that are operated by an internal combustion engine.

In vehicles of the class referred to the exhaust gases from the engine are discharged from the muffler through an exhaust gas discharge pipe arranged underneath the body of the vehicle with its outlet end terminating at a point adjacent the rear end of the body. Owing to the fact that the exhaust gases are discharged into the atmosphere at a point in close proximity to the floor of the body and in such a way that they tend to follow the vehicle when it is traveling forwardly, said gases frequently find their way into the body of the vehicle through the cracks and joints in the floor, thus making it very objectionable to the occupants on account of the poisonous nature and disagreeable odor of said gases. This is particularly true of closed body vehicles such as coupes and sedans, and many cases of sick headache, nausea and other ailments are directly attributable to exhaust gases which penetrate into the interior of an automobile body and pollute the air which the occupants of the automobile breathe.

The main object of my invention is to prevent the exhaust gases from the engine of an automobile or similar passenger carrying vehicle from entering the body of the vehicle.

Another object is to provide an automobile or similar vehicle which is so constructed that when it is in motion currents of air will circulate rearwardly under the floor of the body and downwardly over the back or rear end of the body in such a way as to prevent dust from collecting on the back of the body and prevent the exhaust gases from following the vehicle or clinging to same. Other objects and desirable features of my invention will be hereinafter pointed out.

Figure 1:
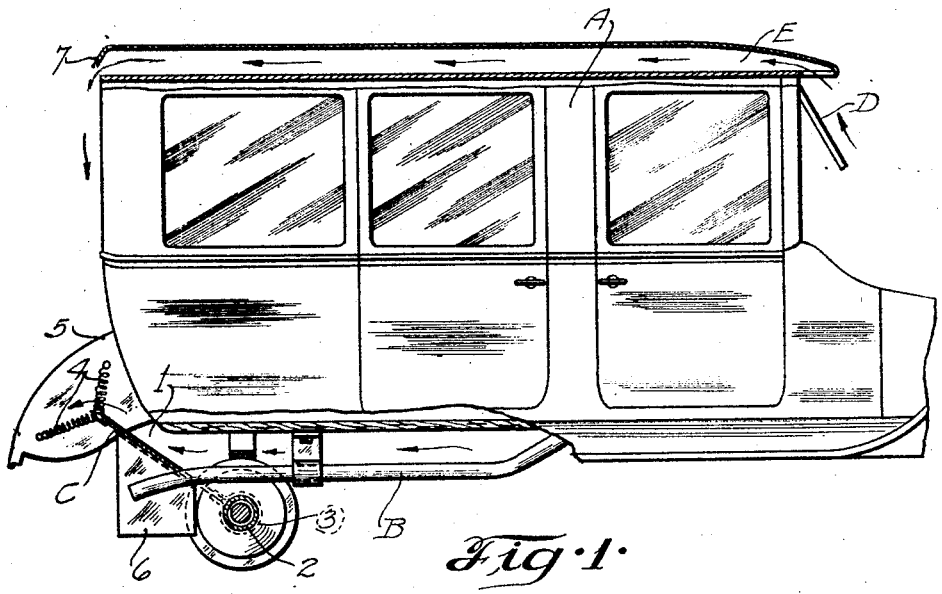
Figure 2:
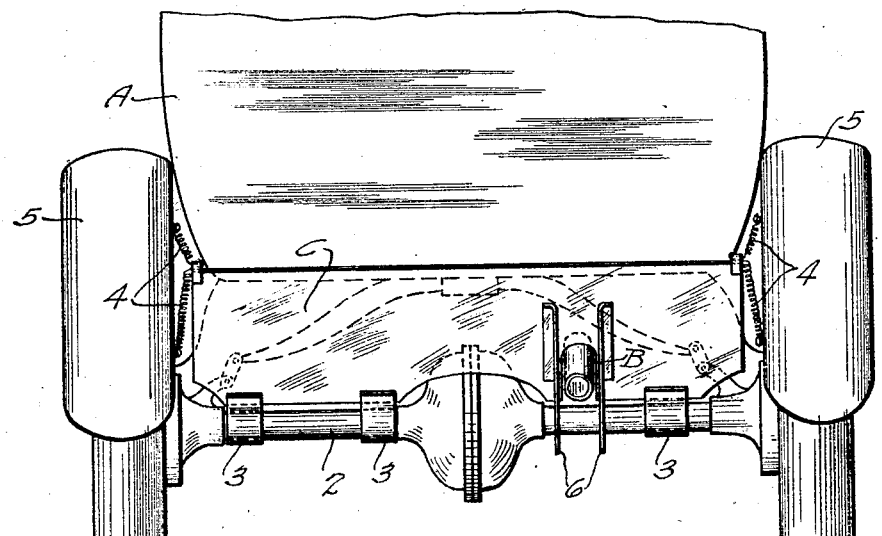

Figure 1 of the drawings is a side elevational view of an automobile constructed in accordance with my invention, partly broken away so as to more clearly illustrate the means that is used for causing currents of air to circulate over the body when the vehicle is traveling forwardly; and Figure 2 is a rear end elevational view of the automobile shown in Figure 1.

Briefly stated, my invention consists of an automobile or other passenger carrying vehicle of the kind that is operated by an internal combustion engine, equipped with a baffle arranged between the outlet end of the exhaust gas discharge pipe and the rear end of the body in such a way that air will circulate rearwardly under the body when the vehicle is traveling forwardly, and thus effectively prevent the exhaust gases from rising and penetrating into the body through the cracks, joints or other openings in the floor of same. In order to deflect the exhaust gases downwardly and prevent said gases from clinging to and following the vehicle and also to prevent dust from accumulating on the back of the body, I provide means for causing a current of air to circulate downwardly over the back of the body when the vehicle is in motion, said downwardly circulating current of air causing the air that circulates rearwardly over the upper edge of the baffle to be deflected downwardly towards the ground.

Referring to the drawings which illustrate the preferred form of my invention, A designates the body of an automobile or other passenger carrying vehicle of the type that is operated by an internal combustion engine, B designates an exhaust gas discharge pipe arranged under the body with its outlet end terminating adjacent the rear end of the body and C designates a baffle arranged above the outlet end of the gas discharge pipe B and spaced away from the rear end of the body A so as to form a flue 1 which induces a rearward circulation of air under the floor of the body, as indicated by the arrows in Figure 1, when the vehicle is traveling forwardly. The baffle C is preferably arranged in such a way that it extends rearwardly and upwardly and is combined with the chassis of the vehicle in such a manner that the body of the vehicle will not strike against same when the vehicle is traveling over a rough road. In the form of my invention herein illustrated the baffle C extends transversely of the vehicle, as shown in Figure 2, and the lower edge of said baffle is hinged to the housing 2 of the rear axle assembly by means of straps 3 that pass through slots formed in the lower edge portion of the baffle. Said baffle is maintained in an upwardly-inclined position, as shown in Figure 1, by springs 4 that are connected to said baffle and to the mud guards 5 of the rear wheels. If desired, a pair of vertically-disposed, parallel shields 6 can be connected to the underside of the baffle C at opposite sides of the exhaust gas discharge pipe B, so as to tend to prevent the exhaust gases from flowing laterally when they are discharged into the atmosphere. When the vehicle is in motion a current of air will circulate rearwardly under the body of the vehicle, and thus eliminate the possibility of exhaust gases finding their way into the body of the vehicle through cracks or joints in the floor of the body.

In order to create a downward circulation of air over the back of the body A when the vehicle is in motion, I arrange a wind deflector D at the front end of the body and provide the top or roof of the body with one or more air conduits E through which air will circulate rearwardly and be discharged downwardly over the back or rear end of the body, as indicated by the arrows in Figure 1. Preferably the air conduit E extends across the entire width of the roof of the body, and the front end of said air conduit is open and arranged in such relation with the air deflector D that the air which strikes against the front side of said deflector when the vehicle is in motion will immediately enter the air conduit E and flow rearwardly through same. At the rear end of the vehicle the air conduit E is provided with a downwardly-inclined air deflector 7 arranged in such a position with relation to the back or rear end wall of the body A, that the air, in escaping from said conduit, will flow downwardly over the back of the body, and thus keep the back of the body practically free from dust. When said downwardly flowing current of air encounters the current of air that flows rearwardly over the upper edge of the baffle C, said rearwardly flowing current of air will be deflected downwardly together with the exhaust gases escaping from the discharge pipe B. Accordingly, in a vehicle of the construction above described there is little liability of the exhaust gases from the engine penetrating into the passenger compartment of the vehicle and polluting the air which the passengers breathe, because when the vehicle is traveling forwardly, currents of air circulate rearwardly under the floor of the vehicle and downwardly over the back of the body of the vehicle in such a way as to deflect the gases escaping from the exhaust gas discharge pipe and prevent said gases from clinging to or following the vehicle. In addition to protecting the passengers of the vehicle from the exhaust gases from the engine, my invention overcomes another very objectionable characteristic of the conventional automobile, namely, the accumulation of dust on the rear end of the vehicle, for when a vehicle constructed in accordance with my invention is in motion, a current of air will circulate downwardly over the rear end of the vehicle in such a way as to keep the same practically free from dust.

While I have herein illustrated my invention embodied in an automobile or the like in which the roof or top of the body of the vehicle is provided with an open-ended air conduit whose rear portion is so designed as to cause a current of air to circulate downwardly over the back or rear end of the body, I do not wish it to be understood that my invention is limited to this particular means for creating a downward circulation of air over the rear end of the body, for if desired, the roof or top of the body of the vehicle can be provided adjacent its rear end with a transversely-disposed baffle or air deflector arranged in such a way as to cause the air which strikes same to be deflected downwardly over the back of the body.

Having thus described my invention, what I claim as new and desire to secure by Letters Patent is:

1. An automobile or similar vehicle provided with a body, and exhaust gas discharge pipe arranged underneath said body, and a device arranged adjacent the rear end of the body between the body and the outlet end of said discharge pipe for causing air to circulate rearwardly under the body when the vehicle is traveling forwardly.

2. An automobile or similar vehicle provided with a body, an exhaust gas discharge pipe arranged underneath the body, and a device at the rear end of the body for causing air to circulate rearwardly under the floor of the body and then downwardly at a point in proximity to the outlet end of said discharge pipe when the vehicle is traveling forwardly, thereby causing the exhaust gases to be deflected towards the ground.

3. An automobile or similar vehicle provided with a body, an exhaust gas discharge pipe arranged underneath the body, and a baffle arranged transversely of the vehicle between the outlet end of said discharge pipe and the body and spaced away from the body so as to form a flue through which air circulates rearwardly when the vehicle is traveling forwardly.

4. An automobile or similar vehicle provided with a body, an exhaust gas discharge pipe arranged underneath the body, a baffle arranged transversely of the vehicle between the outlet end of said discharge pipe and the body and spaced away from the body so as to form a flue through which air circulates rearwardly when the vehicle is traveling forwardly, and depending shields on said baffle arranged at opposite sides of said discharge pipe for confining the gases that escape from the outlet of said pipe.

5. An automobile or similar vehicle provided with a body, an exhaust gas discharge pipe arranged underneath the body, a baffle arranged transversely of the vehicle between the rear end of the body and the outlet end of said discharge pipe, and means for mounting said baffle on the chassis of the vehicle in such a way that it is free to move relatively to the chassis when the vehicle is in motion without destroying the operative relationship between said baffle and the parts with which it co-operates.

6. An automobile or similar vehicle provided with a body, an exhaust gas discharge pipe arranged underneath the body, an inclined baffle arranged transversely of the vehicle between the rear end of the body and the outlet end of said discharge pipe, means for pivotally connecting the lower edge of said baffle to the rear axle housing, and a resilient means for maintaining said baffle in an inclined position.

7. An automobile or similar vehicle provided with a body, an exhaust gas discharge pipe arranged underneath the body, a transversely-disposed baffle arranged between the rear end of the body and the outlet end of said discharge pipe, means for hinging the lower edge of said baffle to the housing of the rear axle assembly, and springs connected to said baffle and to the mud guards of the rear wheels for maintaining said baffle in an inclined position and holding it spaced away from the rear end of the body.

8. An automobile or similar vehicle provided with a closed body, devices arranged at the rear end and on top of the body for causing air to circulate rearwardly under the floor of the body and downwardly over the back and rear end wall of the body when the vehicle is traveling forwardly.

9. An automobile or similar vehicle provided with a closed body, a flue arranged at the rear end of the body for causing air to circulate rearwardly under the floor of the body when the vehicle is traveling forwardly, and an air conduit on the roof or top of the body open at its front end and provided at its rear end with means for directing air downwardly over the back or rear end wall of the body.

10. An automobile or similar vehicle provided with a body, an exhaust gas discharge pipe arranged under the body, a baffle above the outlet end of said discharge pipe that extends rearwardly and upwardly, and means whereby the forward motion of the vehicle causes air to circulate downwardly over the back or rear end of the body past the upper edge of said baffle, thereby deflecting the exhaust gases that escape from said discharge pipe.

11. An automobile or similar vehicle provided with a body, an exhaust gas discharge pipe arranged under the body, a baffle arranged transversely of the vehicle between the outlet end of said discharge pipe and the body and spaced away from the rear end of the body so as to form a flue through which air circulates rearwardly when the vehicle is traveling forwardly, an air conduit on the roof or top of the vehicle provided at its rear end with a downwardly inclined air deflector, and means at the front end of the body for directing air into said conduit.

EDWARD W. SAUNDERS.